United States Patent [19]

McClelland

[11] Patent Number: 5,739,615
[45] Date of Patent: Apr. 14, 1998

[54] ROTOR FOR RELUCTANCE MACHINE

[75] Inventor: Michael Leo McClelland, Leeds, England

[73] Assignee: Switched Reluctance Drives Limited, Harrogate, England

[21] Appl. No.: 681,216

[22] Filed: Jul. 22, 1996

[30] Foreign Application Priority Data

Jul. 24, 1995 [GB] United Kingdom ............. 9515111

[51] Int. Cl.⁶ ............... H02K 1/22; H02K 21/12
[52] U.S. Cl. .......... 310/186; 310/43; 310/91; 310/216; 310/218; 310/265
[58] Field of Search ............. 310/91, 218, 265, 310/43, 216

[56] References Cited

U.S. PATENT DOCUMENTS

| | | | |
|---|---|---|---|
| 4,639,627 | 1/1987 | Takekoshi et al. | 310/156 |
| 4,769,568 | 9/1988 | Kawamura | 310/156 |
| 4,910,861 | 3/1990 | Dohogne | 29/598 |
| 5,053,666 | 10/1991 | Kliman et al. | 310/261 |
| 5,121,605 | 6/1992 | Oda et al. | 60/608 |
| 5,140,210 | 8/1992 | Shirakawa | 310/156 |
| 5,315,200 | 5/1994 | Lemieux et al. | 310/258 |
| 5,463,262 | 10/1995 | Uchida | 310/145 |
| 5,554,900 | 9/1996 | Pop, Sr. | 310/156 |

FOREIGN PATENT DOCUMENTS

| | | |
|---|---|---|
| 0 621 677 A2 | 10/1994 | European Pat. Off. |
| 0 668 652 A1 | 8/1995 | European Pat. Off. |
| 1 488 702 | 7/1969 | Germany |

*Primary Examiner*—Steven L. Stephan
*Assistant Examiner*—Tran N. Nguyen
*Attorney, Agent, or Firm*—Patterson & Keough, P.A.

[57] ABSTRACT

A rotor for a reluctance machine comprises a rotor made up of a stack of laminations defining a cross-sectionally integral rotor profile consisting of rotor poles arranged about a rotor core. A non-magnetic insert is arranged axially along the stack of laminations and a filler spans the interpole region between rotor poles. The filler is attached at either end of the rotor to an end cap and is secured to the insert intermediate the rotor ends. The insert provides a means of securement for the filler to provide stability at high speed.

20 Claims, 3 Drawing Sheets

Section B-B

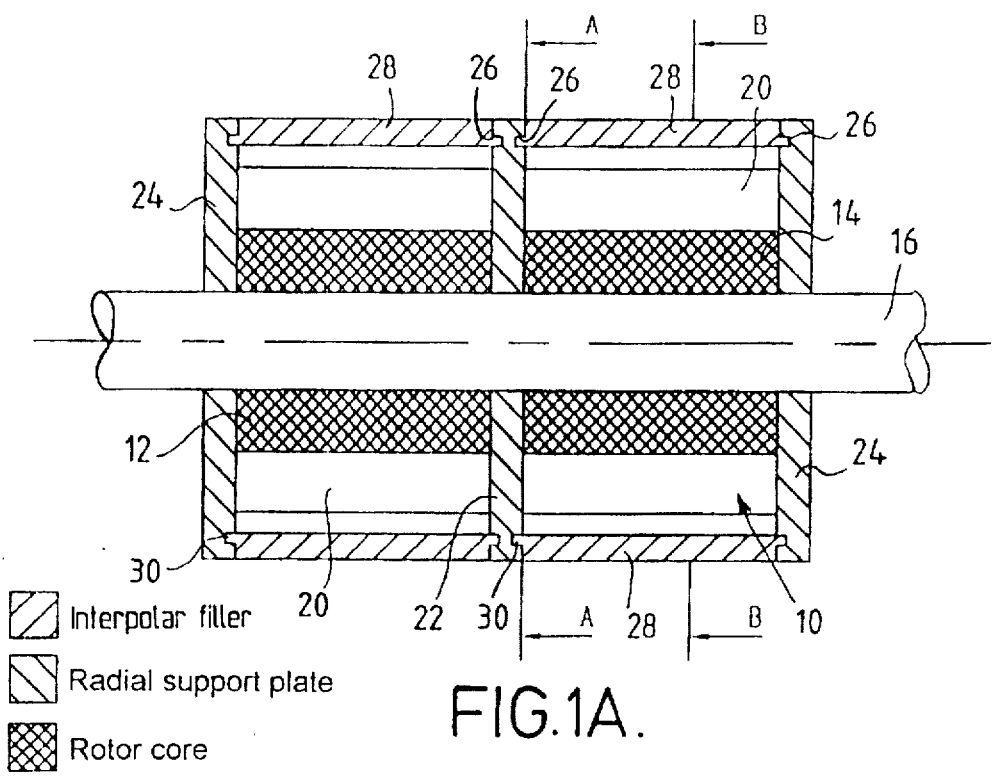
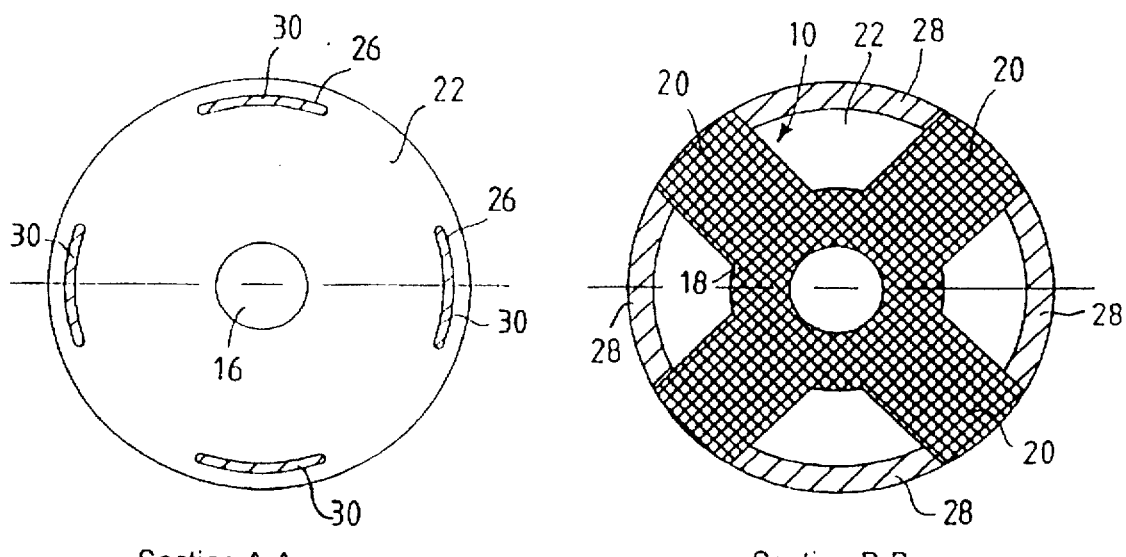
⬚ Interpolar filler
◩ Radial support plate
▨ Rotor core
Section A-A
FIG.1B.
Section B-B
FIG.1C.

- ▨ Interpolar filler
- ▧ Radial support plate
- ▩ Rotor core

Section C-C

Section D-D

ROTOR FOR RELUCTANCE MACHINE

BACKGROUND OF THE INVENTION

1. Field of the Invention

This invention relates to rotors for reluctance machines. The invention is particularly applicable to a reluctance machine designed to be run at high speed.

2. Description of Related Art

Among the inefficiencies that a reluctance machine designer may have to take into consideration are the so-called 'windage losses'. These are the result of the machine rotor creating turbulence in the air as it spins in the stator. The problem of windage losses becomes more and more significant as the operational speed of the machine increases.

It is known to seek to reduce the windage losses associated with a stator by filling the spaces between stator poles.

It is also known to seek to reduce the windage losses associated with a rotor by filling the spaces between rotor poles. An example of this is disclosed in U.S. Pat. No. 5,053,666 (Kliman et al). In Kliman the fillers are keyed into the spaces between rotor poles by angularly projecting, and longitudinally extending projections in one of the rotor poles. The fillers mate with complementarily shaped recesses in the rotor poles. Thus, it is known to attempt to reduce windage losses in a switched reluctance machine rotor by the use of fillers between the rotor poles such that the rotor assembly defines a circular cross-section cylindrical arrangement.

As the working speed of a rotor for a switched reluctance machine increases, the centrifugal forces imposed on the fillers increase accordingly. Some recent developments in switched reluctance motors call for design speeds in excess of 30,000 rpm (500 rev/sec). At such speeds the windage losses are excessive and the ability of known fillers to withstand the high centrifugal forces involved is considered to be inadequate. While such fillers may be secured so that they can withstand the centrifugal forces, they may still creep radially outwardly and upset the balance of the rotor.

In a modified form of rotor disclosed in Kliman, the laminations of the rotor poles are separate segments which are inserted in the spaces between fillers, arranged in a cage-like construction, and fixed to a rotor core. Separate non-magnetic support laminations replace some of the rotor laminations around the rotor core. These support laminations form a ring of intersticial connectors between the axially extending interpole fillers. According to Kliman, each separate rotor pole lamination has to be connected with the filler cage, e.g. by welding. The rotor has to be constructed in many parts and assembled around the filler cage which itself requires relatively elaborate assembly.

SUMMARY OF THE INVENTION

To address this and other disadvantages, it is an object of the present invention to provide a rotor for a reluctance machine that is more simple in construction and more efficient when running.

According to embodiment of the present invention there is provided a rotor for a reluctance machine comprising a rotor shaft, at least a pair of rotor members mounted on the shaft, each defining rotor poles and interpole regions therebetween, a filler in each interpole region and at least one insert also mounted on the rotor shaft, arranged between the rotor members, to which insert the fillers are secured.

The insert preferably has an integral cross-section and is in the form of a discate member mounted on a rotor shaft in common with the rotor members which are separated by the insert. In particular, it is preferable that the insert is circumferentially continuous and defines a radially outer surface which is coincident with the end faces of the rotor poles.

The filler may fill the interpole region. For example, it may be in the form of an injected material such as a resin or mouldable plastics. On the other hand, the filler may define an outer plate, extending between the end faces of adjacent rotor poles.

Preferably, one of the rotor poles and the filler is keyed into the other of the rotor poles and the filler.

The rotor may have an end cap mounted on each axial end of the rotor which is connected with the fillers. Again, the end caps preferably have an outer periphery which is in conformity with the radially outer surface of the pole faces and the interjacent fillers. For a particularly secure construction, it is preferable that at least one end cap and at least a part of at least one filler are of a unitary construction. Alternatively, one of the end cap and the fillers may be secured to the other.

The insert provides securement between the ends of the rotor to which the fillers can be fixed additionally by the use of end caps. The ends of the fillers are secured to the insert which is secured relative to the rotor member.

The insert should desirably have no substantial effect on the flux paths established in the rotor and the stator. The inventor has recognized that the lack of a significant axial component in the flux paths can be exploited to allow the rotor to be split into axially separated components providing a net benefit in the security with which the fillers are held in place.

Preferably, the insert is a non-metallic disc which provides the required centrifugal stiffness, being made of a ceramic material, for example, or a composite plastics material. However, it could be made of a non-magnetic material such as aluminium, although eddy currents would flow in a non-magnetic conductor when such a rotor is used.

While a single insert mounted midway along the axis of the rotor is preferable in some applications, embodiment of the invention also extend to the use of two or more inserts holding the filler radially and being positioned at spaced intervals along the rotor.

Embodiments of the invention have the benefit of anchoring fillers in a rotor particularly for use in high speed applications. While the flux carrying capacity of the rotor is compromised by the presence of the insert, the overall performance of the machine with the insert in place is enhanced because of the avoided windage losses, resulting in a net gain in efficiency without disturbing the radial integrity of the rotor, ie. the direction in which substantially all the flux flows.

BRIEF DESCRIPTION OF THE DRAWINGS

Embodiments of the invention can be put into practice in various ways, some of which will now be described by way of example with reference to the accompanying drawings in which:

FIGS. 1A, B & C are a lateral cross-section, and first and second axial cross-sections taken along lines A—A and B—B, respectively, of an embodiment according to the invention;

DETAILED DESCRIPTION OF PREFERRED EMBODIMENTS

Figure 2:
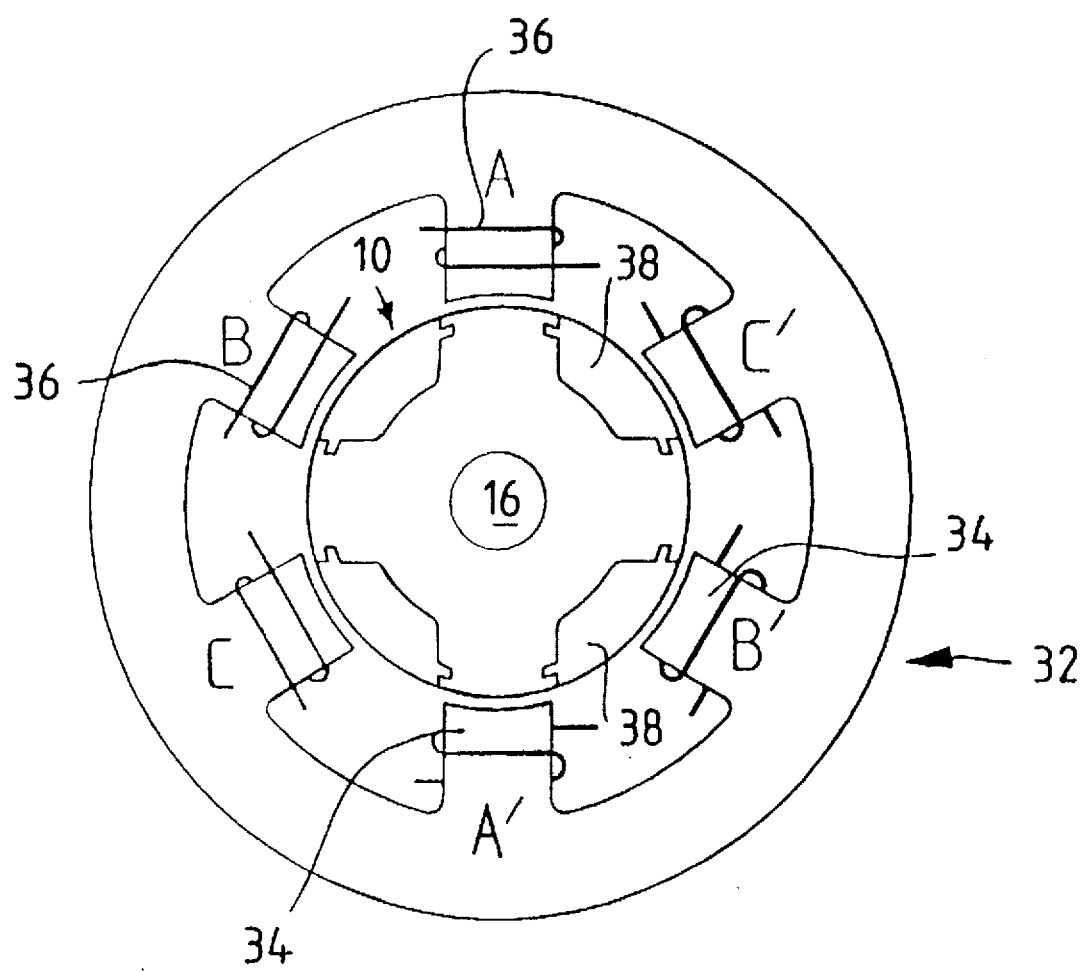
FIG. 2 is a lateral cross-section of a switched reluctance machine embodiment according to the invention.

Referring to FIGS. 1A to C, a rotor assembly for a switched reluctance machine comprises a rotor 10 of conventional cross-section but comprising rotor members in the form of first and second stacks 12 and 14 of rotor laminations which are mounted on, and secured with respect to, a continuous rotor shaft 16. Typical securement methods include keying, clamping, an interference fit or the like as will be well-known to the skilled person. The laminations making up the stacks preferably are known in the art and preferably are made of electrical sheet steel of an appropriate grade, e.g. TRANSIL 315-35, as supplied by British Steel, Great Britain. As will be clear from FIG. 1C, the rotor 10 defines an inner core part 18 and four equi-angular spaced rotor poles 20. The axially adjacent stacks 12 and 14 in this embodiment are of equal length and are axially separated by an insert 22 in the form of a circular disc made of aluminium which is also mounted on and secured to the shaft 16. An end plate 24 is also mounted on the shaft at each end of the rotor 10. The cross-section of the insert and the end caps is circular and of a radial extent coincident with the faces of the poles 20 of the rotor.

The insert 22 and the end plates 24 are formed with blind arcuate recesses 26 extending axially in respective filler contact zones. A filler plate 28 made of ceramic having an arcuate axial section (shown in FIG. 1C) is arranged in each interpole region extending between the angularly adjacent flanks of neighboring rotor poles 20. Each filler plate 28 has an axially extending arcuate projection 30 formed at each end which is located in the corresponding recess 26 in the adjacent end plate 24 and the insert 22, respectively, the projections and recesses forming securing members of the rotor. The filler contact zones alternate circumferentially with rotor-pole contact zones, as can be envisioned with respect to e.g. FIG. 1B.

As will be seen in FIG. 1C, the cylindrical outer surface of the filler plates together with the radially outer pole faces of the rotor poles 20, define a smooth circular cross-section surface. The end plates 24 present a smooth outer surface at either end of the rotor.

At high speeds the central insert 22 serves to retain the fillers in place. While the machine is made reliably quieter running and less lossy, the insert does have some detrimental effect on the flux carrying capacity of the rotor because of the volume of rotor given up to the insert. The iron losses in the rotor increase as the material of the rotor is removed. However, it has been found that the insert according to the invention provides a net benefit by allowing windage losses to be reduced at high speed and simply and reliably secures the fillers in position. Previous techniques for securing the fillers in place have relied on connecting them only at both ends or by holding solid fillers in place in the interpole region.

FIG. 2 shows an alternative form of the invention in a reluctance machine construction comprising a stator 32, defining stator poles 34, in which the rotor 10 is arranged to rotate. The stator poles 34 carry phase windings 36 as is conventional in the art. In this embodiment the rotor is provided with a solid filler 38 in each interpole area. An insert (not shown) is present, similar to that in FIGS. 1A to C, having blind arcuate recesses receiving projections on the filler as before. The solid fillers 38 of FIG. 2 may be either pre-formed or molded to the rotor so that the projections engaging the recesses 26 are formed in the molding process. While the solid filler is shown taking up all of the interpole region, it is equally possible for it to leave voids at, for example, the root of the region between the poles. A suitable material for the molding solid filler is an injection molded plastic loaded with a suitable strengthening material, such as Nylon 66.

Figure 3A:
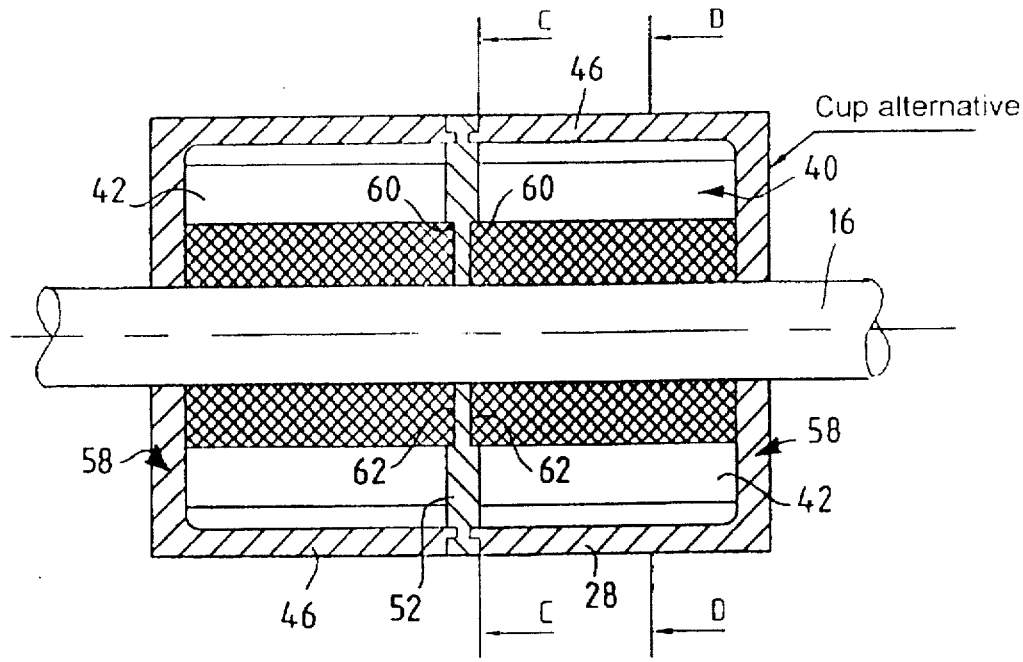
FIGS. 3A, B & C are a lateral cross-section, and first and second axial cross-sections taken along lines C—C and D—D, respectively, of an embodiment according to the invention.
Figure 3B:
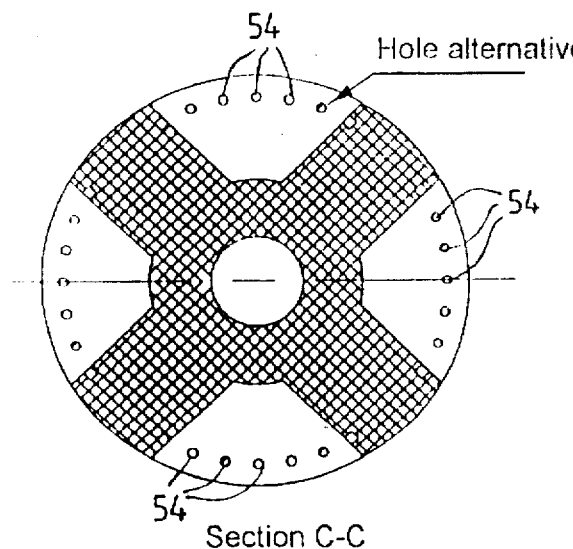
Figure 3C:
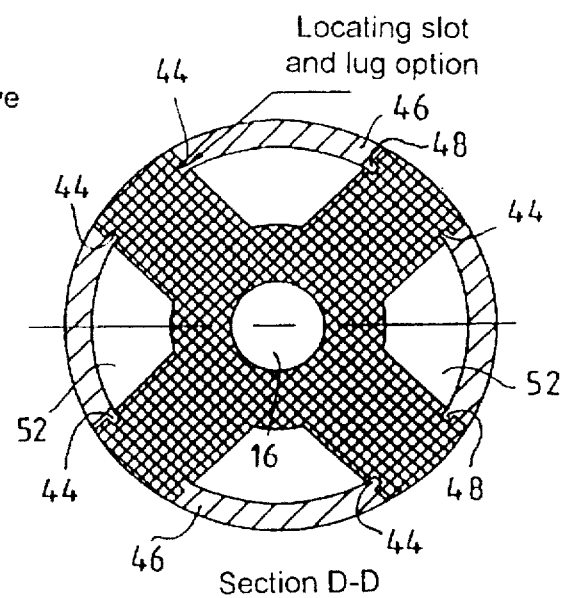

FIGS. 3A to 3C show a further alternative form of the invention in which rotor members 40 have rotor poles 42 formed with axially extending keyways 44 on either flank. A filler plate 46 which is similar to that shown in FIGS. 1A to C has an axially extending lug 48 on each side which is arranged to engage a respective keyway 44 on either side of the interpole area between adjacent poles 42.

In this embodiment an insert 52 is also arranged midway between the rotor lamination stacks on the shaft 16. The insert 52 has an arcuate array of circular blind recesses 54 in place of the equiangularly spaced arcuate recesses of FIGS. 1A to C. The radially inner part of the insert 52 defines a pair of axially opposite recesses 60 in the form of annuli. The rotor laminations are formed with complementarily shaped axial ends 62 that are received in the recesses. This engagement of the insert 52 by a further part of the rotor benefits the security of the fitting of the rotor members on the shaft. The filler plates 46 are integrally molded as part of one of a pair of end caps 58. Each end cap 58 is mounted on the shaft 16 so that the lugs 48 run along the keyways 44, and the end caps 58 mate against a respective axial end of the rotor portions and the distal ends of the filler plates 46 engage the recesses 54.

It will be appreciated that the insert and the fillers could equally well be constructed as an integral member such that the end plates were required to be secured in mating relationship with them. Also, the fillers could be continuous having a keyed relationship with the insert by which they are secured radially and yet able to be slid axially into place.

The presence of the insert reduces the flux carrying capacity of the rotor. Nevertheless, embodiments of the invention allow the use of fillers at high speed by improving the manner in which they are retained in place. The insert provides an attachment point between the rotor ends without disturbing the cross-sectional integrity of the rotor laminations. The rotor fillers are reliably held in place while the overall efficiency of the machine is improved at high speeds because of the reduction in windage losses.

Embodiments of the invention is applicable to rotors designed to run at different speeds. Nevertheless, it of particular advantage at very high speeds. Thus, particular care should be exercised in choosing the material for the fillers and the inserts. It is preferable that the filler should not increase the rotor mass significantly. Therefore, the density of the filler material may need to be taken into consideration. The fillers have to be magnetically transparent so that they have little or no appreciable effect on the flux path between the stator poles and the rotor poles.

A metal filler could be used, but it is necessary for it to insulated at least at one end to eliminate the possibility of losses due to a closed electrical circuit being formed around a rotor pole. A suitable metal filler is aluminium as it is non-magnetic. A particularly preferred material for the filler is a ceramic as it is both non-magnetic and non-conducting. A further alternative is an epoxy resin type molded filler particulary for solid filler applications.

Thus, while the present invention is susceptible to various modifications and alternative forms, specific embodiments have been shown by way of example in the drawings and description herein. However, it should be understood that the invention is not intended to be limited to the particular forms disclosed. Rather, the invention is intended to cover all modifications, equivalents and alternatives falling within the spirit and scope of the invention as defined in the appended claims.

What is claimed is:

1. A rotor for a reluctance machine, the rotor comprising:
   a rotor shaft extending in an axial direction through the rotor;
   at least a pair of rotor members mounted on the shaft, each rotor member defining rotor poles and interpole regions therebetween;
   a filler disposed in each interpole region; and
   at least one substantially continuous discate insert mounted on the rotor shaft between the rotor members, the at least one discate insert being free of magnetic members extending in holes therethrough and having a substantially circular outer circumference, the substantially circular outer circumference being substantially continuous, the at least one discate insert defining a plurality of rotor-pole contact zones and a plurality filler contact zones, the fillers being secured to the at least one discate insert by at least one securing member in each filler contact zone extending in the axial direction, securement of the at least one discate insert to the rotor shaft and the securement of the fillers to the at least one discate insert in each filler contact zone serving to substantially anchor the fillers even at high rotational rotor speeds.

2. A rotor as claimed in claim 1 in which the rotor poles have ends, the fillers and the ends of the rotor poles defining a substantially continuous radially outer surface of the rotor.

3. A rotor as claimed in claim 2 in which the cross-section of the rotor is substantially circular.

4. A rotor as claimed in claim 1 in which the fillers substantially fill the interpole regions.

5. A rotor as claimed in claim 1 in which the fillers each comprise an arcuate plate extending between radially outer edges of circumferentially adjacent rotor poles, axially adjacent ones of the plates being separated by the at least one discate insert.

6. A rotor as claimed in claim 1 in which one of the rotor poles and the fillers is keyed to the other of the rotor poles and the fillers.

7. A rotor as claimed in claim 1, further including end plates respectively mounted on each axial end of the rotor and being connected with the fillers.

8. A rotor as claimed in claim 7 in which the end plates have an outer periphery which is in conformity with a radially outer surface defined by the rotor poles and the fillers.

9. A rotor as claimed in claim 7 in which at least one end plate and its adjacent fillers are a unitary structure.

10. A rotor as claimed in claim 7 in which one of the end plates and the fillers is keyed to the other of the end plates and the fillers.

11. A rotor as claimed in claim 1 in which the insert comprises a unitary structure separating the rotor members.

12. A switched reluctance machine comprising a stator defining stator poles, a rotor as claimed in claim 1 and a phase winding arranged to energize at least one of the stator poles.

13. A rotor for a reluctance machine, the rotor comprising:
    a rotor shaft extending in an axial direction;
    at least a pair or rotor members mounted on the shaft, each rotor member defining rotor poles and interpole regions therebetween;
    filler means, disposed in each interpole region, for reducing windage losses at high rotor speed; and
    insert means, mounted on the rotor shaft between rotor members, for substantially retaining the filler means in place, the insert means being substantially continuous, circular, and free of magnetic members extending in holes therethrough, the insert means extending between axially adjacent fillers of the filler means and between axially adjacent rotor members, the insert means being secured to each filler by at least one axially extending securing means.

14. A rotor as claimed in claim 13, wherein the filler means comprises a plurality of plates that, with ends of the rotor poles, define a substantially continuous outer surface of the rotor.

15. A rotor as claimed in claim 13, wherein:
    the filler means includes projection means for securing the filler means in place; and
    the insert means includes recess means for receiving the projection means of the filler means.

16. A rotor as claimed in claim 15, wherein:
    the recess means comprises a plurality of arcuate recesses; and
    the projection means comprises a plurality of arcuate projections corresponding to the recesses.

17. A rotor as claimed in claim 15, wherein:
    the recess means comprises an arcuate array of recesses; and
    the projection means comprises an arcuate array of projections corresponding to the arcuate array of recesses.

18. A rotor as claimed in claim 1, wherein the at least one securing member comprises a projection-recess combination, one of the filler and the at least one discate insert including a projection and the other of the filler and the at least one discate insert including a recess for receiving the projection.

19. A rotor as claimed in claim 14, wherein axially adjacent ones of the filler plates are separated by the insert means.

20. A rotor as claimed in claim 1, wherein the at least one discate insert is substantially continuous from the rotor shaft outward to the outer circumference.

* * * * *